United States Patent

Fuhrman

Patent Number: 5,752,436
Date of Patent: May 19, 1998

[54] POTATO PEELING APPARATUS

[75] Inventor: Jeffrey E. Fuhrman, Hanover, Pa.

[73] Assignee: UTZ Quality Foods, Inc., Hanover, Pa.

[21] Appl. No.: 736,517

[22] Filed: Oct. 24, 1996

[51] Int. Cl.$^6$ .................. A23N 7/00; A47J 17/00
[52] U.S. Cl. .................. 99/633; 99/584; 99/623; 99/630
[58] Field of Search .................. 99/584, 623–633, 99/638–541; 451/327; 426/480–483

[56] References Cited

U.S. PATENT DOCUMENTS

| | | | |
|---|---|---|---|
| Re. 33,357 | 9/1990 | Randall | 358/106 |
| 107,321 | 9/1870 | Atkinson. | |
| 777,590 | 12/1904 | de Bonneville. | |
| 809,582 | 1/1906 | Robinson. | |
| 877,550 | 1/1908 | Clark | 99/631 |
| 942,932 | 12/1909 | Robinson. | |
| 954,047 | 4/1910 | Powell. | |
| 1,359,766 | 11/1920 | Stephen. | |
| 1,378,058 | 5/1921 | Schaefer. | |
| 1,384,356 | 7/1921 | Smith. | |
| 1,422,708 | 7/1922 | Hodgdon et al.. | |
| 1,457,007 | 5/1923 | Smith. | |
| 1,637,830 | 8/1927 | Mannsdorff. | |
| 1,641,993 | 9/1927 | Schaefer. | |
| 1,644,448 | 10/1927 | Robinson. | |
| 1,664,304 | 3/1928 | McCathron. | |
| 1,681,737 | 8/1928 | Lindahl. | |
| 1,695,420 | 12/1928 | Eckert. | |
| 1,728,846 | 9/1929 | Westgaard. | |
| 1,766,999 | 6/1930 | Johnston. | |
| 1,886,061 | 11/1932 | Speidel. | |
| 1,945,978 | 2/1934 | Palombo et al. | 146/49 |
| 1,966,501 | 7/1934 | Hoe | 146/49 |
| 2,231,543 | 2/1941 | McClung et al. | 146/49 |
| 2,262,383 | 11/1941 | Carlson | 146/50 |
| 2,326,356 | 8/1943 | Haslam | 146/201 |
| 2,499,291 | 2/1950 | Baumann | 146/49 |
| 2,569,607 | 10/1951 | Hardt | 146/50 |
| 2,613,712 | 10/1952 | Pearlman | 146/49 |
| 2,633,884 | 4/1953 | Carlstedt | 146/49 |
| 2,676,633 | 4/1954 | Lohre et al. | 146/49 |
| 2,794,472 | 6/1957 | Veenhuizen et al. | 146/49 |
| 2,860,371 | 11/1958 | Krull | 17/5 |
| 3,134,413 | 5/1964 | Dorsa et al. | 146/49 |
| 3,134,414 | 5/1964 | Winroth | 146/50 |
| 3,480,057 | 11/1969 | Wilhelm | 146/231 |
| 3,496,976 | 2/1970 | Nielsen | 146/50 |
| 3,581,887 | 6/1971 | Radutsky et al. | 209/73 |
| 3,762,308 | 10/1973 | Greene et al. | 99/632 |
| 3,765,533 | 10/1973 | Stephens et al. | 209/73 |
| 3,848,524 | 11/1974 | Semrow | 99/631 |
| 4,122,951 | 10/1978 | Alaminos | 209/545 |
| 4,152,767 | 5/1979 | Laliotis | 364/560 |
| 4,164,291 | 8/1979 | Carlow | 414/136 |
| 4,168,005 | 9/1979 | Sandbank | 209/552 |
| 4,184,598 | 1/1980 | Cowlin et al. | 209/705 |
| 4,205,752 | 6/1980 | Malvick et al. | 209/564 |
| 4,221,297 | 9/1980 | Aranda Lopez et al. | 209/576 |
| 4,251,555 | 2/1981 | Kroenig | 426/231 |
| 4,271,968 | 6/1981 | Mehrkam et al. | 209/564 |
| 4,281,764 | 8/1981 | Fowler et al. | 209/557 |
| 4,308,959 | 1/1982 | Hoover et al. | 209/563 |
| 4,348,277 | 9/1982 | Cowlin et al. | 209/705 |
| 4,350,442 | 9/1982 | Arild et al. | 356/51 |
| 4,351,437 | 9/1982 | Long | 209/545 |
| 4,368,462 | 1/1983 | Crawley | 340/723 |
| 4,391,185 | 7/1983 | Stanley | 99/489 |
| 4,442,764 | 4/1984 | Bos et al. | 99/633 |
| 4,450,760 | 5/1984 | Wilson | 99/536 |
| 4,493,105 | 1/1985 | Beall et al. | 382/21 |
| 4,493,420 | 1/1985 | Dennis | 209/587 |
| 4,520,702 | 6/1985 | Davis et al. | 83/71 |
| 4,581,632 | 4/1986 | Davis et al. | 358/106 |
| 4,581,762 | 4/1986 | Lapidus et al. | 382/22 |
| 4,626,677 | 12/1986 | Browne | 250/514 |
| 4,687,107 | 8/1987 | Brown et al. | 209/556 |
| 4,687,326 | 8/1987 | Corby, Jr. | 356/5 |
| 4,710,389 | 12/1987 | Dornow | 426/231 |
| 4,735,323 | 4/1988 | Okada et al. | 209/582 |
| 4,738,175 | 4/1988 | Little et al. | 83/71 |
| 4,776,466 | 10/1988 | Yoshida | 209/565 |
| 4,790,022 | 12/1988 | Dennis | 382/8 |
| 4,831,922 | 5/1989 | Cogan et al. | 99/486 |
| 4,889,241 | 12/1989 | Cogan et al. | 209/552 |
| 4,963,035 | 10/1990 | McCarthy et al. | 382/28 |
| 4,998,467 | 3/1991 | Kovach | 99/632 |
| 5,020,675 | 6/1991 | Cowlin et al. | 209/538 |
| 5,065,672 | 11/1991 | Federighi, Sr. | 99/631 |
| 5,085,325 | 2/1992 | Jones et al. | 209/580 |
| 5,090,576 | 2/1992 | Menten | 209/587 |

| | | | |
|---|---|---|---|
| 5,106,641 | 4/1992 | Bichel | 426/483 |
| 5,277,320 | 1/1994 | Corkill et al. | 209/511 |
| 5,305,895 | 4/1994 | Hermann | 209/586 |
| 5,307,738 | 5/1994 | Amstad | 99/625 |
| 5,318,173 | 6/1994 | Datari | 209/580 |
| 5,415,083 | 5/1995 | Nagaoka | 99/491 |
| 5,617,783 | 4/1997 | Beeler | 426/483 X |
| 5,662,034 | 9/1997 | Fuhrman | 99/633 |

FOREIGN PATENT DOCUMENTS

| | | |
|---|---|---|
| 18457 | 1/1914 | Denmark . |
| 2558690 | 8/1985 | France . |
| 312877 | 6/1918 | Germany . |
| 493625 | 3/1930 | Germany . |
| 54-145164 | 11/1979 | Japan . |
| 745157 | 2/1956 | United Kingdom . |
| 941124 | 11/1963 | United Kingdom . |
| 1288266 | 9/1972 | United Kingdom . |
| 1330132 | 9/1973 | United Kingdom . |
| 1393061 | 5/1975 | United Kingdom . |
| 1401289 | 7/1975 | United Kingdom . |
| 1449755 | 9/1976 | United Kingdom . |
| 1534590 | 12/1978 | United Kingdom . |
| 2022817 | 12/1979 | United Kingdom . |

*Primary Examiner*—Timothy F. Simone
*Attorney, Agent, or Firm*—Thomas Hooker, P.C.

[57] ABSTRACT

A potato peeling apparatus includes a drum-type batch peeler having a rotary plate and three vertically adjustable, cylindrical liners. Each liner has a different abrasive material and a separate drive for moving the liner between a raised and a lowered position. The liners have different diameters to allow positioning of the three liners inside each other in raised or lowered positions.

19 Claims, 8 Drawing Sheets

POTATO PEELING APPARATUS

FIELD OF THE INVENTION

The invention relates to a drum-type batch peeler for peeling potatoes and other food products.

DESCRIPTION OF THE PRIOR ART

Drum-type batch peelers typically include a cylindrical drum with abrasive material mounted on a cylindrical liner permanently mounted in the drum. A rotary floor or plate is provided at the bottom of the drum. A batch of potatoes is placed in the drum, rotated by the plate and thrown up by centrifugal force against the abrasive liner. Frictional contact between the potatoes and the liner peels the potatoes. After the batch has been peeled for a period of time, the peeled potatoes are discharged for subsequent processing.

Conventional batch peelers use a single abrasive liner for peeling. The liner has a single grade of abrasive, typically a coarse sand-like abrasive, a medium sand-like abrasive or a soft fiber brush. Different grades of abrasive are required in order to peel potatoes having different types of skin. For instance, spring potatoes having delicate skins are best peeled using a medium abrasive or brush liner. Potatoes with thick and tough skins are best peeled using a coarse abrasive liner.

Conventional potato peelers are not adjustable during operation other than by varying the length of time the potatoes are in the peeler. This inflexibility means that a machine set up to peel a potato with a particular type of skin and surface configuration cannot be easily converted to peel potatoes with a different type of skin and configuration. In order to change the grade of abrasive in a peeler, the apparatus must be shut down, the original liner must be manually removed from the peeler and a new liner with a different abrasive must be manually installed. Changing liners is an expensive and time consuming process. The peeler is out of production during change over.

SUMMARY OF THE INVENTION

The invention is an improved batch peeling apparatus having a plurality of independently movable cylindrical liners with different grades of abrasive on the inner surfaces of the liners. The liners are selectively positioned in the drum for enhanced peeling during operation of the peeler. Drives mounted on the top of the drum selectively raise and lower the liners as required. During peeling, a liner having an appropriate grade abrasive is positioned in the bottom of the drum with the abrasive exposed to the interior of the drum. The other liners are positioned either above the drum or in the drum behind the selected liner.

The liners and the drives for raising and lower the liners occupy a vertical space above the drum approximately three times the height of the drum. This permits locating the peeler in a work area having a low ceiling. Each liner drive includes a drive cylinder above the center of the drum with a vertical shaft, radial ribs extending outwardly from the lower end of the shaft and circumferentially spaced vertical arms extending down from the outer ends of the ribs to the top of a liner. The vertical arms are joined to the liner. The ribs and vertical arms of each drive are spaced apart through an approximately 120° sector of the circumference of the liner to support the 360° liner and permit vertical movement of the liner independent of the position of the other liners. The drives also prevent rotation of the liners during peeling because of peeling impacts with potatoes. Preferably, the abrasive surface of the innermost liner is most abrasive and the abrasive surface of the outermost liner is least abrasive.

Potatoes may be peeled using a single liner positioned in the bottom of the drum with the other two liners raised or, alternatively, with an outer liner located in the drum outside of the liner against which the potatoes are peeled. Alternatively, an initial peel may be performed using a first liner with a relatively abrasive peeling surface, following which the first liner is raised to expose a second liner with a less abrasive surface which is used to complete the peel. Further, the peel can be conducted with a first liner having a less abrasive surface fully positioned in the bottom of the drum and a second liner having a more abrasive surface partially overlying the upper portion of the abrasive surface of the first liner. In this way, potatoes may be peeled by a two-band abrasive surface with the lower band being less abrasive than the upper band.

Other objects and features of the invention will become apparent as the description proceeds, especially when taken in conjunction with the accompanying drawings illustrating the invention, of which there are eight sheets and one embodiment.

DESCRIPTION OF THE PREFERRED EMBODIMENT

Potato peeling apparatus 10 includes a rectangular base 12, a cylindrical drum 14 mounted on the top of the base 12, and three vertically movable, cylindrical liners 16, 18 and 20 in the drum. The liners are located inside the drum 14 and are individually movable to positions above the drum. Liners 16, 18 and 20 are arraigned nested inside each other with outermost liner 16 adjacent the drum, liner 18 between liner 16 and liner 20, and liner 20 inside liner 18. As illustrated, the diameter of liner 16 is greater than the diameter of liner 18 and the diameter of liner 18 is greater than the diameter of liner 20. The bottom of the drum is open.

Figure 3:
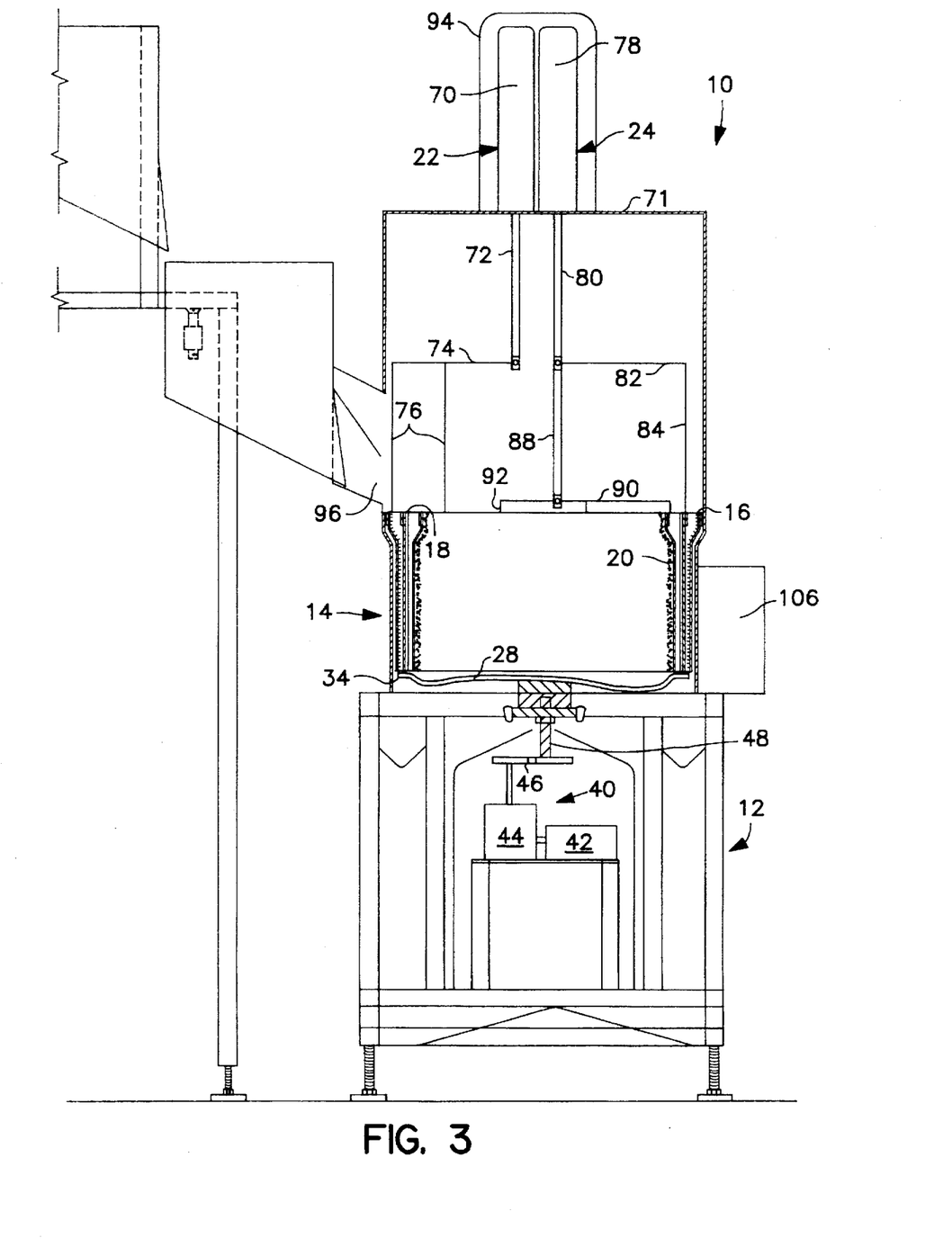
FIGS. 3–6 are sectional views taken generally along line 3—3 of FIG. 2 showing the peeler in different positions.
Figure 6:
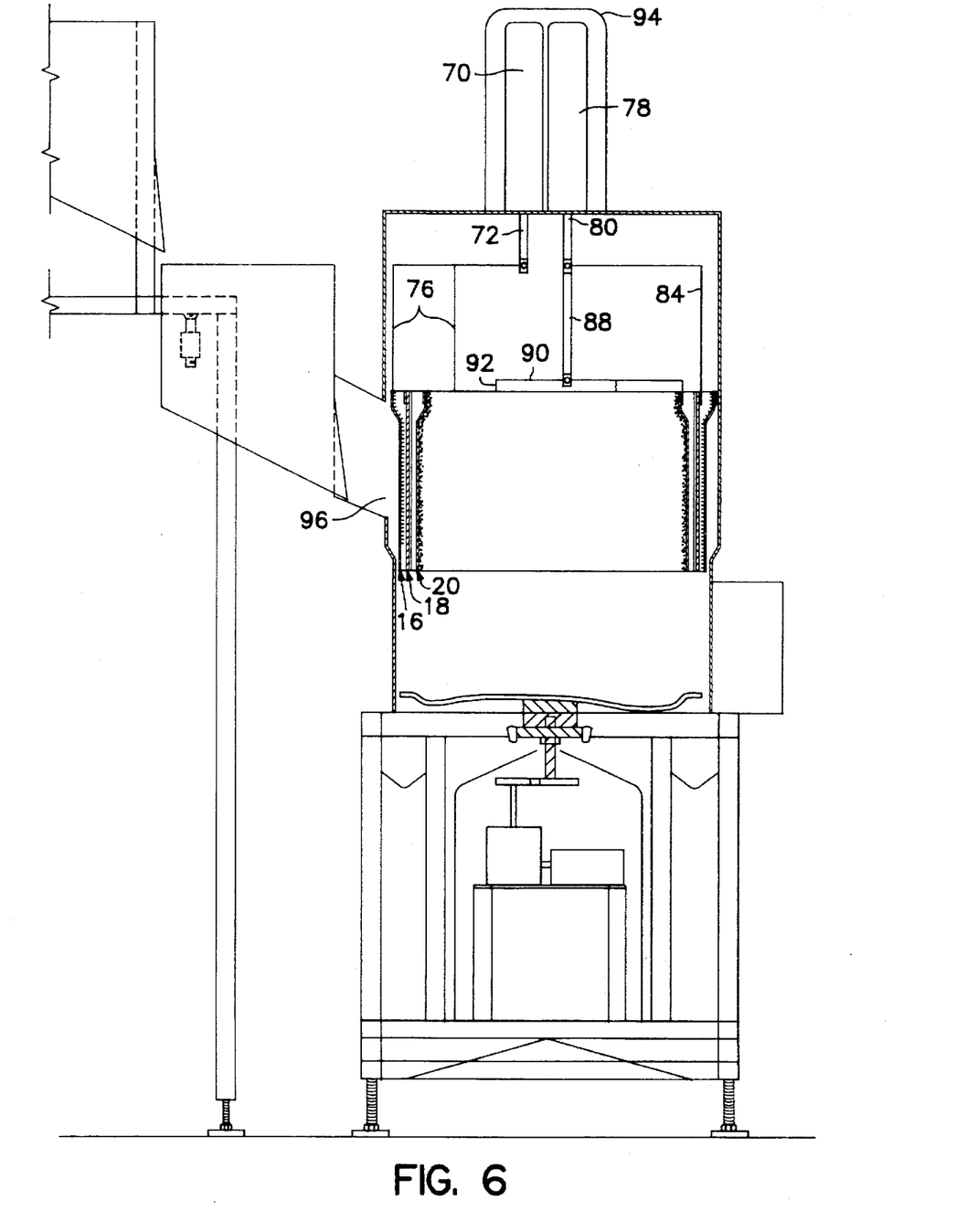
Figure 7:
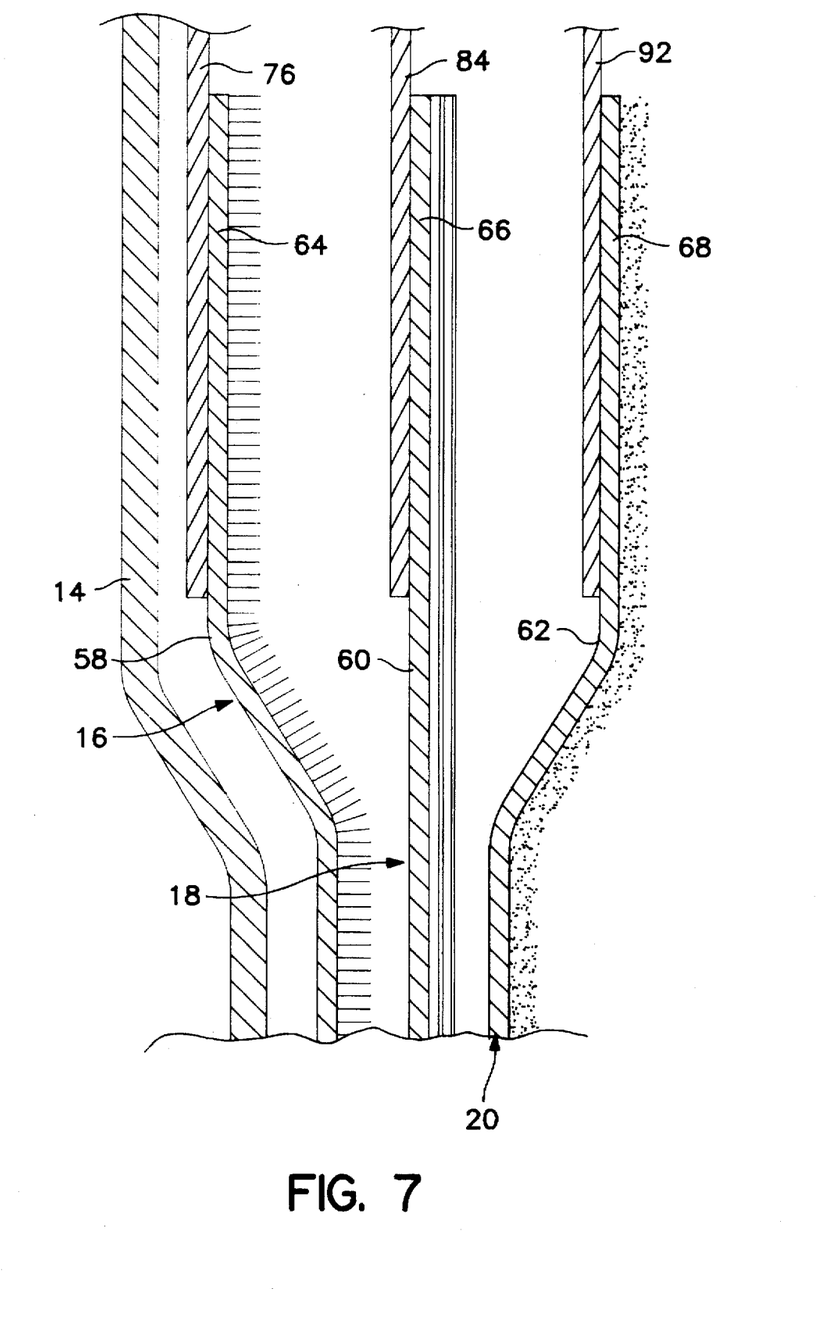
FIG. 7 is a sectional view taken generally through the top of the liners showing upper portions of the liners with vertical arms joined to the liners.
Figure 8:
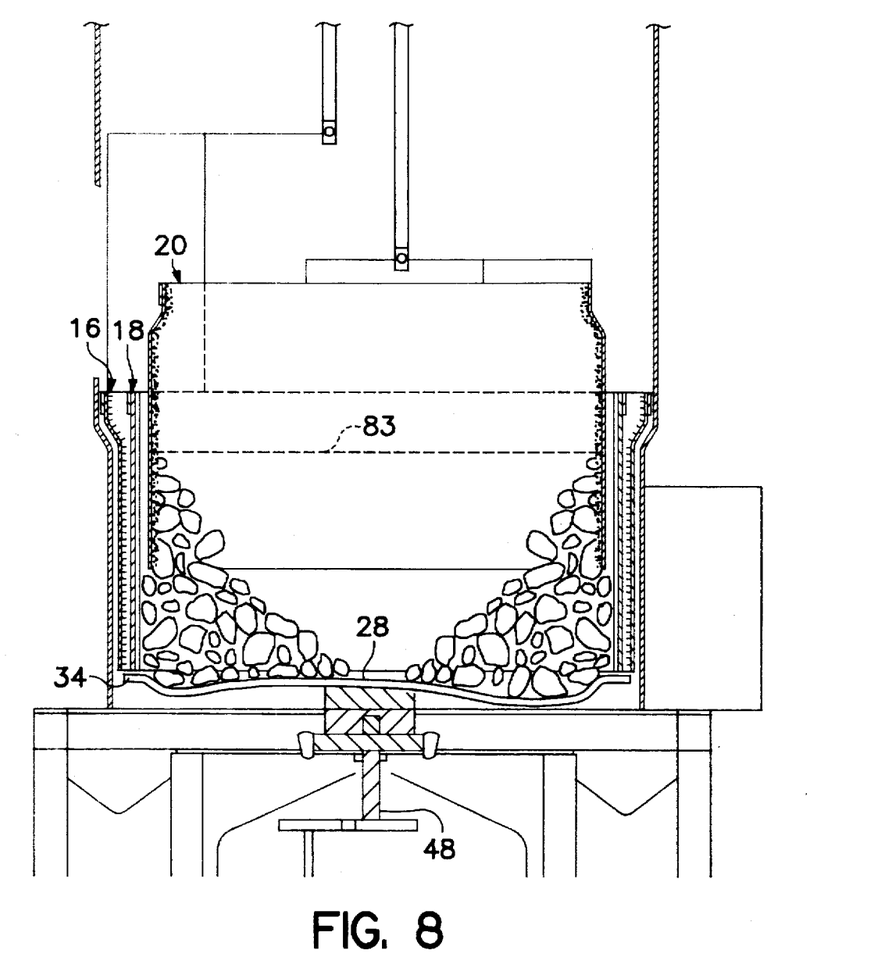
FIG. 8 is a sectional view showing potatoes being peeled in the peeler.

Peeler 10 includes like liner drives 22, 24 and 26 mounted on cover 71 of drum 14 and joined to liners 16, 18 and 20, respectively. The liner drives move the liners vertically between lowered positions in the drum as shown in FIG. 3 and raised positions as shown in FIG. 6. The liner drives also permit a liner to be positioned in a partially raised position as shown in FIG. 8 where the abrasive on the liner is located in the upper portion of the drum and the abrasive on an outer liner is exposed at the bottom of the drum.

Potato driving rotary plate 28 is located at the bottom of the drum 14 and is spaced a short distance inwardly from the drum to provide a gap between an outer edge of plate 28 and the inner surface of the drum. The top of plate 28 includes a pair of diametrically opposed high regions 30 and a pair of diametrically opposed low regions 32. During rotation of plate 28, the vertical variations in the surface of the plate between adjacent regions aid in tumbling the potatoes to increase the efficiency of the peeling operation.

The outer edge of plate 28 forms a raised lip 34. Plate 28 includes drainage slots 36 and 38 for drainage of the water from the peeler 10. Each low region 32 includes two elongate slots 36 located radially inward of and below the lip 34 and a short slot 38 located between slots 36 at approximately the low point of the low region 32. The slots 38 are located a short distance inwardly from slots 36. The slots permit drainage of water through the plate but do not injure or capture potatoes during peeling.

Figure 1:
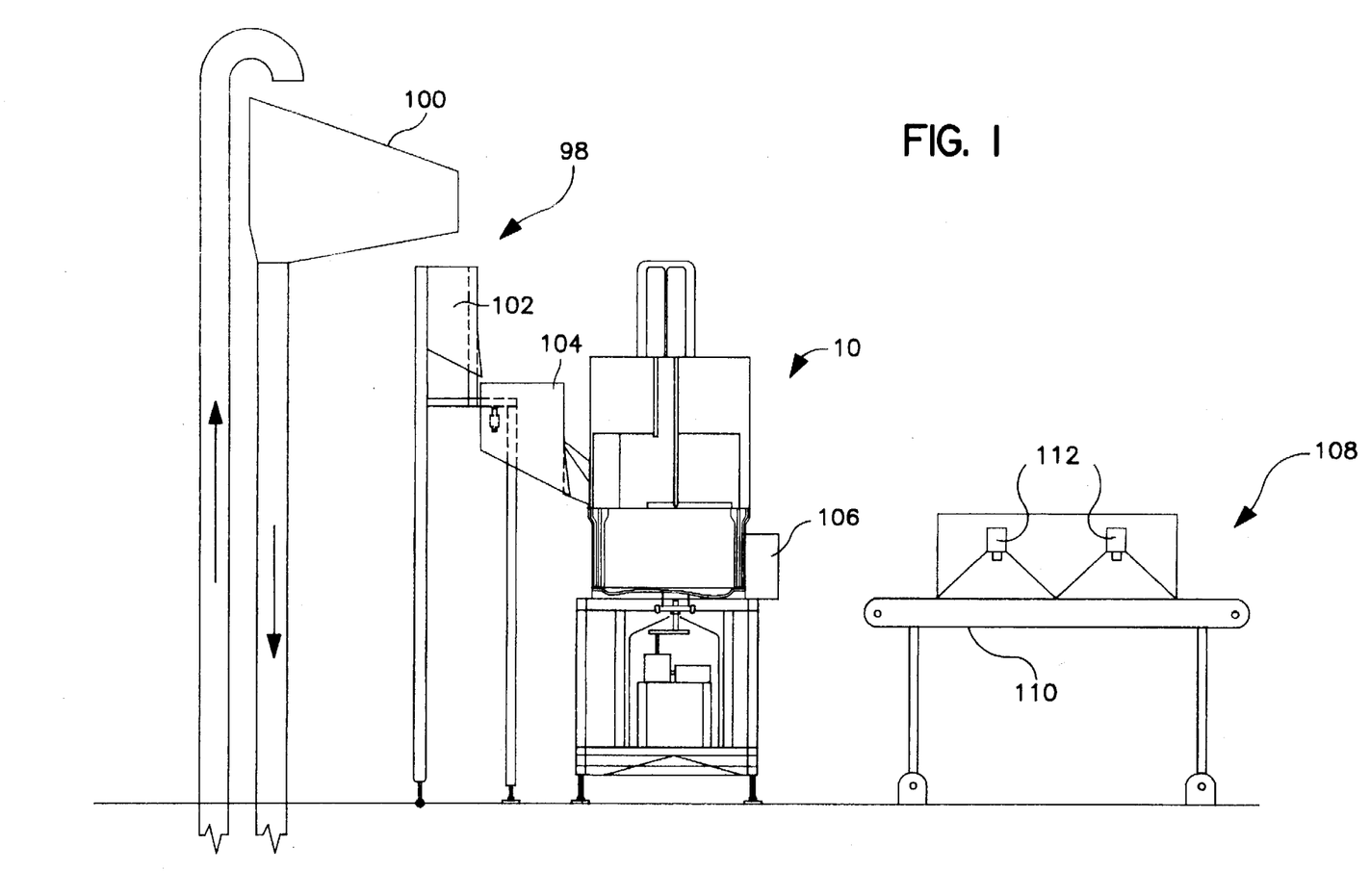
FIG. 1 is a side view of a potato peeling system with a peeling apparatus according to the invention.
Figure 2:
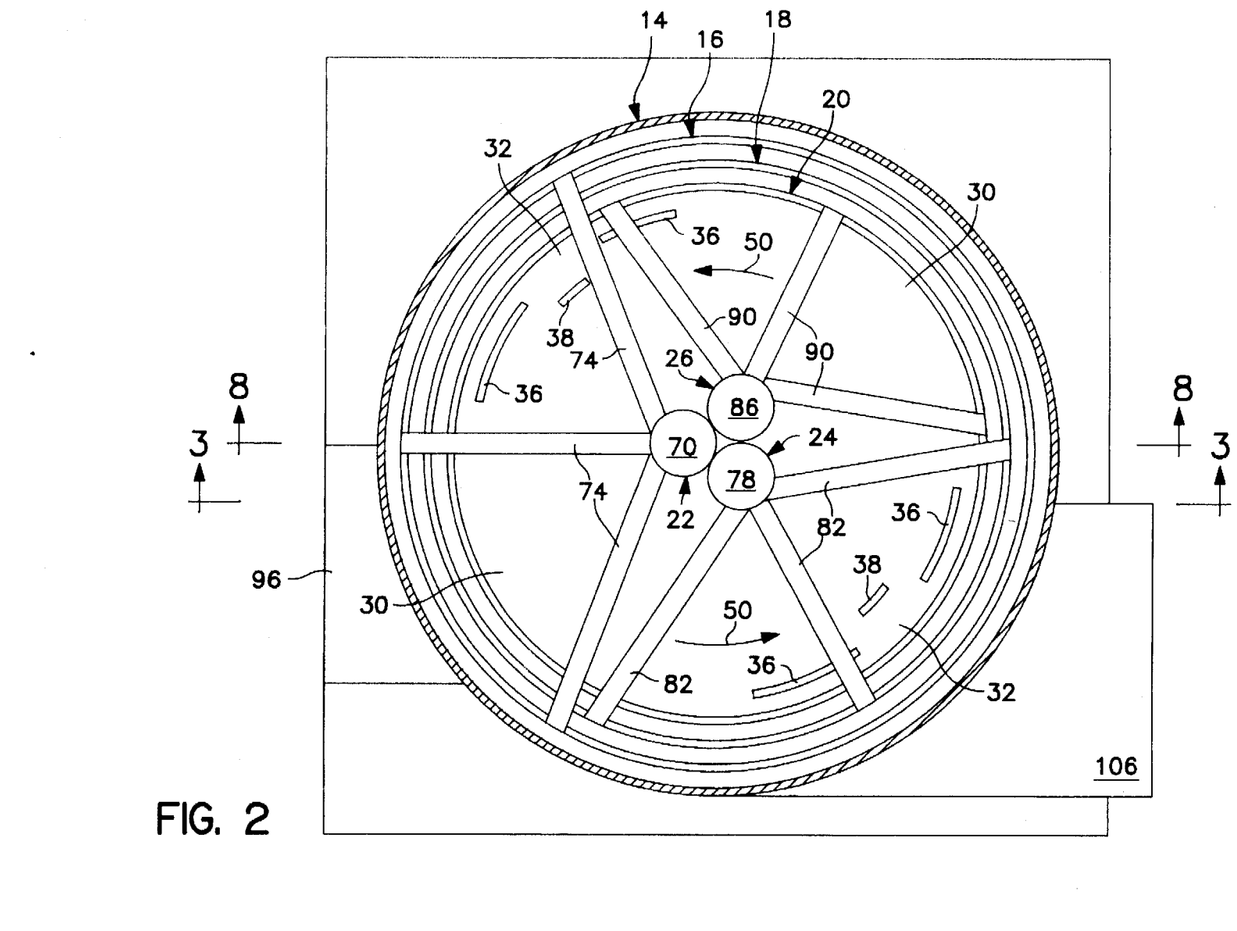
FIG. 2 is a top view of a potato peeling apparatus according to the invention.

Plate drive 40 is located in base 12 beneath plate 28 and includes plate drive motor 42, gear box 44 and drive train 46 connected to a drive shaft 48 supporting the plate. Shaft 48 is mounted on the base 12 through a suitable bearing so that operation of motor 42 rotates plate 28 in the direction of arrows 50 as shown in FIG. 2.

Plate drive 40 is located in metal shroud 54 with shaft 48 extending outwardly through a central opening in the shroud. The shroud protects the drive from liquid and peelings falling down from drum 14. The liquid and peelings are collected in a drain pan 56 mounted on the bottom of base 12 and are removed.

Liners 16, 18 and 20 each include an outer cylindrical tube or body 58, 60 and 62, respectively. A band of abrasive peeling material is secured on the interior cylindrical surface of each body 58, 60 and 62. The upper portion 64 of body 58 is flared radially outwardly from the circumference of body 58 providing a gap between the upper portion 64 and an upper portion 66 of body 60. The upper portion 68 of body 62 is flared radially inwardly from the circumference of body 62 providing a gap between the upper portion 66 and the upper portion 68. The gaps facilitate attachment of the liners to the liner drives.

The abrasive peeling material secured to outer liner body 58 is formed of short inwardly facing synthetic fibers, which may be nylon fibers, having a length of about ⅛ to 3/16 inches. The abrasive material secured to middle liner body 60 comprises a medium abrasive grit. The abrasive material secured to inner liner body 62 comprises a relatively course abrasive grit. Other peeling materials may be substituted for the above mentioned materials, if desired.

Liner drive 22 for outer liner 16 includes a drive cylinder 70 mounted on drum cover 71, a vertical shaft 72 operably joined to drive cylinder 70 extending downward into drum 14, three radial ribs 74 join to the lower end of shaft 70 and extending outwardly, and three circumferentially spaced vertical arms 76 extending downwardly from the outer ends of ribs 74 to the top 64 of liner 16.

Liner drive 24 for middle liner 18 includes a drive cylinder 78 mounted on drum cover 71, a vertical shaft 80 operably joined to drive cylinder 78 extending down towards drum 14, three radial ribs 82 joined to the lower end of shaft 80 extending outwardly, and three circumferentially spaced vertical arms 84 extending downwardly from the outer ends of ribs 82 to the top 66 of liner 18.

Liner drive 26 for inner liner 20 includes a drive cylinder 86 mounted on drum cover 71, a long vertical shaft 88 operably joined to drive cylinder 86 extending down towards drum 14, three radial ribs 90 joined to the lower end of shaft 88 extending outwardly, and three circumferentially spaced short vertical arms 92 extending downwardly from the outer ends of ribs 90 to the top 68 of liner 20. Shaft 88 is approximately twice as long as shafts 72 and 80, and arms 92 are very short. If desired, the ends of ribs 90 may be directly joined to the top of inner liner 20.

Drive cylinders 70, 78 and 86 are mounted on top of drum 14 within drive housing 94 on cover 71. Vertical arms 76, 84 and 92 are spaced around the top edges of their respective liners. Each set of arms occupies an approximate 120° arc around the drum 14. The three arms of each set of vertical arms 76, 84 and 92 are preferably equally spaced from each other along the 120° arc. The spacing allows each liner drive to operate independently of the other drives and raise and lower the liners independently of the positions of the other liners. Liner drives 22, 24 and 26 are secured against rotation and prevent rotation of the liners during peeling because of impacts with rotating potatoes.

Figure 4:
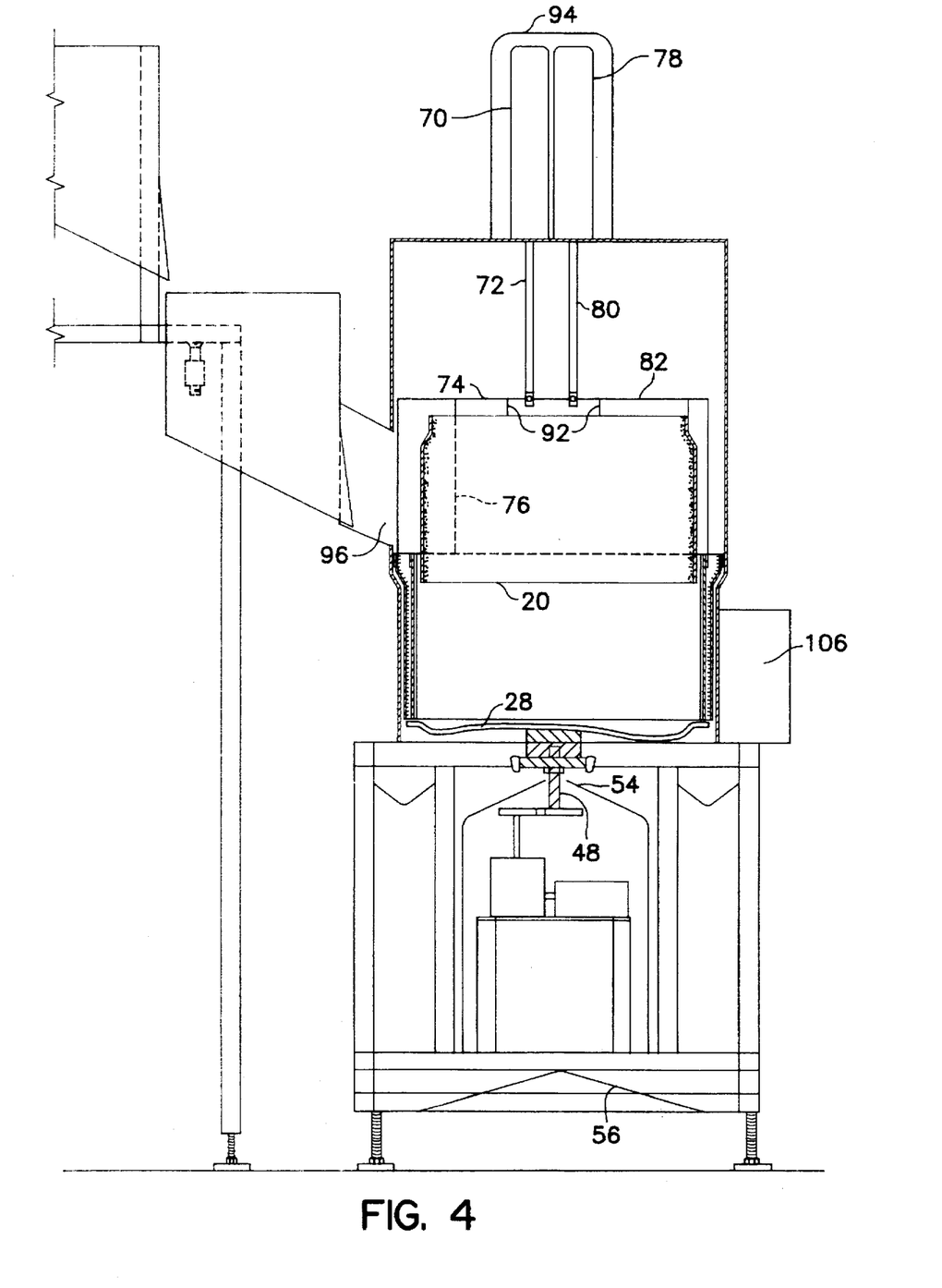
Figure 5:
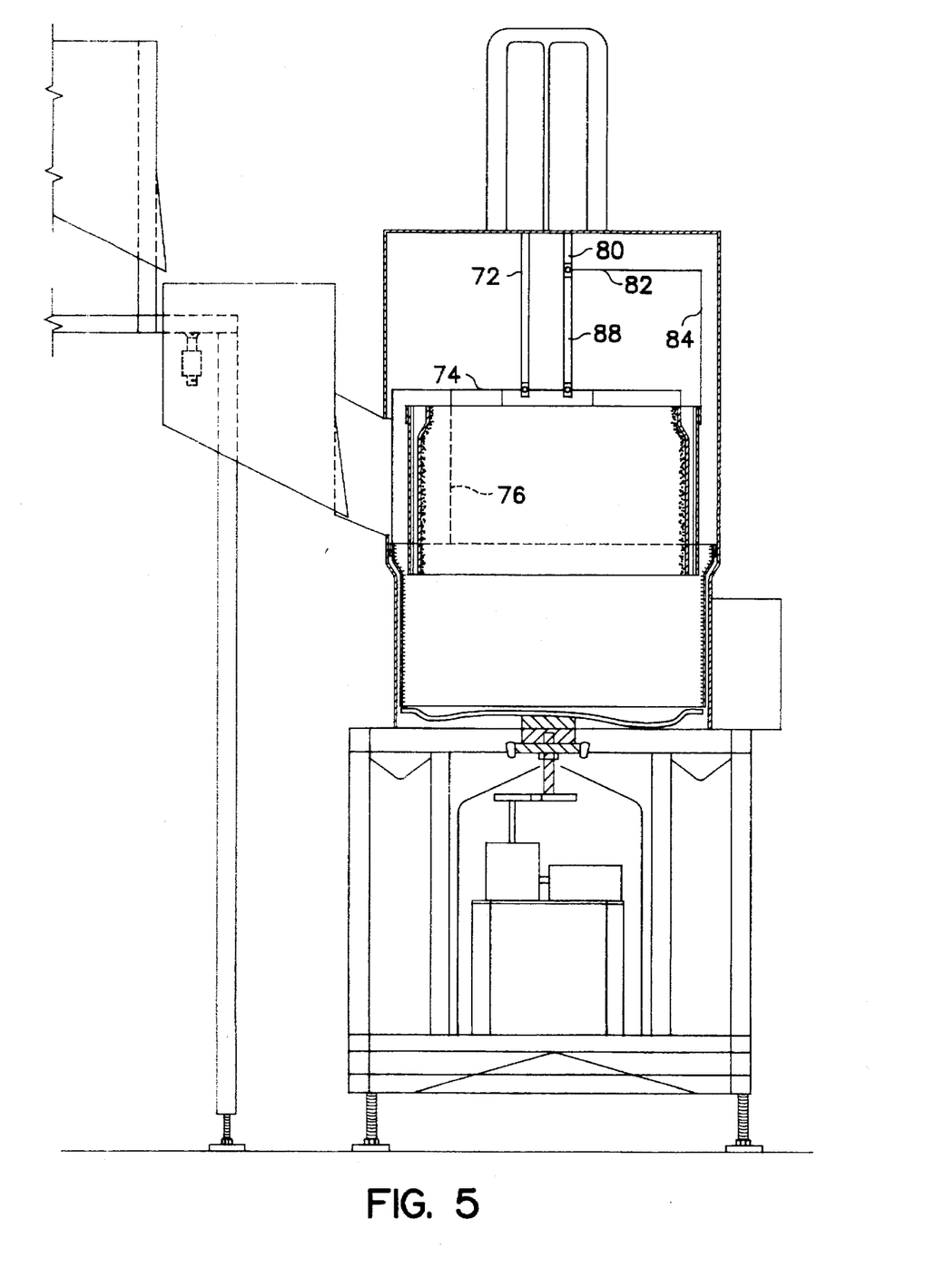

As illustrated in FIG. 2, ribs 74 extend over the tops of the inner liner 20 and intermediate liner 18. Likewise, ribs 82 extend over the top of the inner liner 60. The vertical arms 76 and 84 extend downwardly from ribs 74 and 82 a distance equal or somewhat greater than the working height to which potatoes are thrown up during peeling. Compare FIGS. 4 and 8. This arrangement allows the inner liner 20 to be raised with liners 16 and 18 fully lowered. See FIG. 4. The drum has height above the plate 28 approximately three times the working height to accommodate the liners and the drive ribs and arms. The drive cylinder extends up above cover 71 a distance approximately equal to the working height. If desired, different, lower drives may be provided to raise and lower the liners and reduce the overall height of the peeler.

Potato intake opening 96 is provided in drum 14 a distance above the liners when lowered. See FIG. 3. Potato infeed assembly 98 periodically discharges a batch of potatoes to be peeled through opening 96 and into the bottom of the peeler. The infeed assembly 98 transports unpeeled potatoes and water from a storage area by auger to a flume 100. In the flume, water is drained prior to discharging the potatoes into a storage hopper 102. When a new batch of potatoes is ready to be peeled, the potatoes are discharged from the storage hopper to a weigh hopper 104. The weigh hopper determines the weight of the batch of unpeeled potatoes prior to loading the batch into the peeler through opening 96.

A potato discharge opening 106 is provided in drum 14 above plate 28 and directly across opening 96. Potato discharge opening 106 discharges peeled potatoes to a discharge assembly 108.

Discharge assembly 108 transports peeled potatoes from the peeler to various stations for further processing. The peeled potatoes are deposited on a weigh belt conveyor 110 where that peeled weight of the batch is determined and the area of unpeeled skin left on the potatoes is determined by cameras 112.

Operation of the potato peeling apparatus 10 is automatically controlled by a computer system responsive to a number of inputs to maximize peeling efficiency in accordance with peel standards for particular types of potatoes. The computer system includes a programmable logic controller (PLC) responsive to inputs including the weight of a batch of unpeeled potatoes delivered to the peeler from the potato infeed assembly, the weight of the peeled batch of potatoes as determined by the potato discharge assembly and the area of unpeeled skin left on the peeled potatoes in the batch as determined by a peeled potato monitoring system.

The operation of the batch peeler may be controlled by the PLC or manually to vary the rotational speed of plate 28, the duration of the peel for each batch, and the time during the peel the potatoes are peeled against a particular abrasive band.

Typically, the rotational speed of the plate 28 is slowed to approximate the velocity of the potatoes as they are fed into the peeler in order to reduce impact injury to the potatoes. The rotational speed of plate 28 is also slowed during discharge to reduce impact injury.

The operation of the potato peeling apparatus will now be described.

Unpeeled potatoes are delivered to intake opening 96 by the infeed assembly 98. The infeed assembly determines the weight of each batch of unpeeled potatoes prior to feeding them into peeler 10.

Prior to feeding of a batch of potatoes into the peeler, the liner drives 22, 24 and 26 are actuated to fully lower liners 16, 18 and 20 to the positions of FIG. 3 where the tops of the liners are located below intake opening 96. When in this position, the liners do not obstruct feeding of a batch of potatoes from the infeed assembly into the peeler. Arms 76 are spaced apart such that they do not interfere with the infeed of unpeeled potatoes. Also, the speed of plate drive motor 42 is reduced to reduce the rotational speed of plate 28 to approximate the speed of the potatoes as they fall down through intake opening 96 and onto the plate. In this way, impact injury to the unpeeled potatoes due to the fall is reduced. For instance, for liners having an interior diameter of about three feet where the bottom of the intake opening is approximately 16 inches above the plate, the rotational speed of the plate may be slowed to about 52 rpm.

With the liners lowered and plate speed reduced, the infeed assembly allows the batch of weighed unpeeled potatoes to fall into the peeler. After the potatoes are delivered into the peeler, they may be peeled against the course abrasive inner liner 20. In this case, the speed of plate 28 is increased after the potatoes are fed into the drum. If desired, liner drive 26 maybe actuated to raise liner 20 to expose liner 18, so that the potatoes are to be peeled by the fine abrasive grit. If the potatoes are to be peeled by the brush band, both drives 24 and 26 are actuated to raise liners 18 and 20 to expose liner 16. With the proper band exposed for peeling, plate motor 42 is accelerated to rotate plate 28 at a peeling speed of from about 103 to about 125 rpm for a three foot diameter peeler.

High speed rotation of the plate rotates and throws the potatoes outwardly against the band extending upwardly from the plate to the working height 83 shown in FIG. 8. The potatoes are not thrown higher than the top of the band.

As shown in FIG. 8, most of the potatoes collect at the bottom of the drum near the plate and some potatoes are thrown further up the liner. The potatoes are more densely pressed against the liner closer to the plate 28 at the bottom of the drum by centrifugal force. The density of potatoes decreases above the plate 28. As the density decreases, so does the centrifugal force pressing the potatoes against the liner for peeling. A decrease in force biasing a potato against an abrasive, decreases peeling efficiency. When a single grade abrasive liner is at the bottom of the drum, potatoes near plate 28 are peeled quicker and more extensively than those further above the plate 28. To more effectively regulate the amount each potato in a batch is peeled, liner 20 can be partially raised. With liner 20 partially raised, the more densely packed potatoes are exposed to the less abrasive material of liner 16 or 18 while the less densely packed potatoes are exposed to the more abrasive material of liner 20 and peeling efficiency along the working height is equalized so that all potatoes are peeled equally.

The potatoes are peeled as they move along the abrasive surface and across the surface of plate 28. The surface of plate 28 alternates between high regions 30 and low regions 32. As the plate rotates, the contours of the plate tumble the potatoes to improve peeling. Peeling is continued until a desired quality peel has been achieved. For instance, it may be necessary to peel the potatoes until all or nearly all of the potato peel has been removed. Alternatively, a lighter peel, with a greater amount of skin left on the potato, may be required. This type of peel could be advantageous where it is desirable to remove a minimum percentage by weight of potato during peeling, thereby maximizing the weight of the final food product made from the peeled potato.

With some thin-skinned potatoes, it may be advantageous to initiate the peel using the abrasive of one of liners 18 or 20 and then finishing the peel using the less abrasive and gentler brush of liner 16. This is easily accomplished by actuating liner drives 24 and 26 during peeling to raise liner 18 or 20 above drum 14 so that the brush abrasive of liner 16 is exposed to rotating plate 28. This operation may be performed during peeling without the necessity of slowing plate 28. Obviously, the drives 24 and 26 may be used to raise liners 18 and 20 during peeling to facilitate peeling a given batch of potatoes using any or a number of the three abrasive materials, as required for a particular peel.

The peeler includes a conventional spray system (not illustreated) which delivers water into liners 16, 18 and 20 during peeling to aid in the peeling and discharge of peeled skin from the liner. The water and peelings fall down into base 12 through the gap between plate 28 and the inner surface of drum 14. Water is also drained through slots 36 and 38.

After peeling has been completed, drives 22, 24 and 26 are actuated to fully raise the liners 16, 18 and 20 and uncover the discharge opening 106. Continued rotation of plate 28, preferably slowed to prevent damage to the potatoes, discharges the batch of peeled potatoes through opening 106 and onto the discharge assembly 108. The discharge assembly moves the peeled potatoes away from the peeler. As the potatoes move away from the peeler 10, sensors in the discharge assembly determine the weight of the peeled potatoes. The control system compares the weight of the peeled batches with the weight of unpeeled batches to determine the average percentage of weight lost for a number of batches. The system compares the determined average weight lost with the desired loss and then automatically adjusts the length of the peel, or in some cases, the abrasive material exposed during peeling, in order to increase or decrease weight loss so that the actual weight loss matches the desired weight loss. This adjustment is performed automatically by the control system in accordance with the computer program for the particular peeler.

Apparatus 10 has been described in connection with peeling potatoes. Apparatus 10 is particularly useful in peeling potatoes but may be used advantageously to peel other food products including fruits and vegetables.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A peeling apparatus comprising a vertical drum, a rotary plate at the bottom of the drum; a plate drive connected to the plate to rotate the plate; an intake opening in the drum above the plate; a discharge opening in the drum above the plate; a plurality of vertically movable liners in the drum; an abrasive on an inner surface of each liner; and a drive system connected to said plurality of liners operable to move each liner between a work position above the plate and a second position away from the work position independent of the position of another liner.

2. An apparatus as claimed in claim 1 wherein said liners are cylindrical and have different diameters.

3. An apparatus as claimed in claim 2 wherein said plurality of liners comprise three liners.

4. An apparatus as claimed in claim 3 wherein the outermost liner has a least abrasive material on an inner surface and the innermost liner has a most abrasive material on an inner surface.

5. An apparatus as claimed in claim 4 wherein said outermost liner has a brush abrasive material, said innermost liner has a course grit abrasive material, and an intermediate liner has a fine grit abrasive material.

6. An apparatus as claimed in claim 5 wherein the drive system includes three cylinders mounted on said drum; and each of said cylinders has a vertical shaft extending into said drum, ribs connected to a lower end of the vertical shaft, said ribs extending radially outward, and vertical arms connected to the outer ends of the ribs, extending downward and joined to the top of one of said liners, some of said ribs extending over the top of another of said liners.

7. An apparatus as claimed in claim 5 wherein the outermost liner is flared radially outwardly and the innermost liner is flare radially inwardly.

8. An apparatus as claimed in claim 7 wherein the surface of said rotary plate includes two diametrically opposed high regions and two diametrically opposed low regions, said high regions being located vertically above said low regions.

9. An apparatus as claimed in claim 1 wherein the other position is above the work position.

10. An apparatus as claimed in claim 9 wherein the inlet opening is located above the liners when in the work portion and the outlet opening is located below the liners when in the raised position.

11. A peeling apparatus comprising a vertical drum; a rotary plate in the bottom of the drum dimensioned to fit in the drum, a plate drive connected to the plate to rotate the plate in the drum, an intake opening in the drum; a discharge opening in the drum; a plurality of vertically movable cylindrical liners in the drum, said liners having different diameters so that they can be fitted together at the same level in the drum, a different grade abrasive on an inner surface on each liner; a drive mechanism connected to the liners to selectively move each liner vertically between a work position adjacent the plate and a raised position above the work position.

12. The apparatus as claimed in claim 10 wherein the intake opening is located in the drum adjacent the raised position and the discharge opening is located in the drum adjacent the work position.

13. An apparatus as claimed in claim 12 wherein said liners include an outer liner located adjacent the drum, an inner liner and an intermediate liner located between said outer and inner liners, a course abrasive on the inner surface of the inner liner, a fine abrasive on the inner surface of the outer liner and an intermediate abrasive on the inner surface of the intermediate liner.

14. An apparatus as claimed in claim 13 wherein the abrasive on one liner is a grit and the abrasive on another liner is a brush.

15. An apparatus as claimed in claim 14 wherein said drive mechanism is located adjacent the top of the drum and is joined to the top of each liner.

16. An apparatus as claimed in claim 15 wherein said drive mechanism includes a power cylinder connected to each liner.

17. An apparatus as claimed in claim 16 wherein the drive mechanism for one of said liners extends over the top of another liner.

18. An apparatus as in claim 1 wherein said plate extends under the lower portions of said liners.

19. An apparatus as in claim 11 wherein the outer circumferential edge of the plate extends under the lower portions of said liners.

* * * * *